(12) United States Patent
Zamberger et al.

(10) Patent No.: US 11,607,922 B2
(45) Date of Patent: Mar. 21, 2023

(54) SPRING FOR USE IN CONJUNCTION WITH A VEHICLE

(71) Applicant: HENDRICKSON COMMERCIAL VEHICLE SYSTEMS EUROPE GMBH, Judengburg (AT)

(72) Inventors: Joerg Zamberger, Fohnsdorf (AT); Friedhelm Nattland, Kaarst (DE); Severin Marteau-Lorant, Grand-Charmont (FR); Rainer Leonards, Jülich (DE)

(73) Assignee: Hendrickson Commercial Vehicle Systems GmbH, Judengburg (AT)

( * ) Notice: Subject to any disclaimer, the term of this patent is extended or adjusted under 35 U.S.C. 154(b) by 122 days.

(21) Appl. No.: 16/970,055

(22) PCT Filed: Jan. 9, 2019

(86) PCT No.: PCT/EP2019/050395
§ 371 (c)(1),
(2) Date: Aug. 14, 2020

(87) PCT Pub. No.: WO2019/158276
PCT Pub. Date: Aug. 22, 2019

(65) Prior Publication Data
US 2021/0070122 A1    Mar. 11, 2021

(30) Foreign Application Priority Data

Feb. 14, 2018   (AT) .............................. A 50139/2018

(51) Int. Cl.
*B60G 11/12*    (2006.01)
*B60G 11/04*    (2006.01)
(Continued)

(52) U.S. Cl.
CPC .............. *B60G 11/12* (2013.01); *B60G 11/04* (2013.01); *F16F 1/027* (2013.01); *F16F 1/185* (2013.01);
(Continued)

(58) Field of Classification Search
CPC .................... B60G 11/12; B60G 11/04; B60G 2202/112; B60G 2204/121; B60G 2204/41;
(Continued)

(56) References Cited

U.S. PATENT DOCUMENTS 1,458,912 A  *  6/1923  Draver ................... B60G 11/02
                                                    267/46
1,583,003 A  *  5/1926  Miller .................... B60G 11/08
                                                    267/45
(Continued)

FOREIGN PATENT DOCUMENTS

CN       106163838 A      11/2016
DE    102013107889 A1      1/2015
(Continued)

OTHER PUBLICATIONS

International Search Report and Written Opinion from the International Searching Authority for International Application No. PCT/EP2019/050395, dated Apr. 12, 2019 (23 Pages).
(Continued)

*Primary Examiner* — Robert A. Siconolfi
*Assistant Examiner* — James K Hsiao
(74) *Attorney, Agent, or Firm* — Cook Alex Ltd.

(57) ABSTRACT

A spring for use in conjunction with a vehicle, in particular a leaf spring (1), preferably a parabolic spring, has a single-part spring leaf (12) made of steel, in particular spring steel, having a central region (2) and two adjoining edge regions (4a, 4b), wherein the edge regions (4a, 4b) each have an end region (5a, 5b), the end regions (5a, 5b) can
(Continued)

each be connected to a chassis in a stationary manner via a rolled eye (11), and the total length of the spring when installed on the vehicle is substantially unchangeable in all load states. In the unloaded state, the spring leaf (12) has two bending sections (13, 14), which each have a curvature with a curvature direction, wherein the curvature directions of the two bending sections (13, 14) are opposed, and the two bending sections (13, 14) merge into each other in the region of a turning point (15). The first bending section (13) is a vertical spring section and runs from the end region (5a) of the first edge region (4a) via the central region (2) to the turning point (15). The second bending section (14) is a horizontal and vertical spring section and runs from the turning point (15) to the end region (5b) of the second edge region (4b).

17 Claims, 1 Drawing Sheet

(51) Int. Cl.
    *F16F 1/02*     (2006.01)
    *F16F 1/18*     (2006.01)
    *F16F 1/26*     (2006.01)

(52) U.S. Cl.
    CPC .......... *F16F 1/26* (2013.01); *B60G 2202/112* (2013.01); *B60G 2204/121* (2013.01); *B60G 2204/41* (2013.01); *B60G 2206/428* (2013.01); *B60G 2206/72* (2013.01); *B60G 2800/162* (2013.01); *F16F 2224/0208* (2013.01); *F16F 2238/022* (2013.01)

(58) Field of Classification Search
    CPC .......... B60G 2206/428; B60G 2206/72; B60G 2800/162; F16F 1/027; F16F 1/185; F16F 1/26; F16F 2224/0208; F16F 2238/022
    See application file for complete search history.

(56) References Cited

U.S. PATENT DOCUMENTS

| | | | | |
|---|---|---|---|---|
| 3,685,812 A | * | 8/1972 | Buchesky | F16F 1/22 267/47 |
| 4,718,693 A | * | 1/1988 | Booher | B60G 21/055 267/149 |
| 5,161,785 A | * | 11/1992 | Ingvarsson | B60G 11/04 267/45 |
| 6,129,369 A | * | 10/2000 | Dudding | B60G 11/12 267/270 |
| 6,435,485 B1 | * | 8/2002 | Greco | F16F 1/185 267/260 |
| 8,585,026 B2 | * | 11/2013 | Dittmar | F16F 1/26 297/302.1 |
| 8,967,645 B2 | * | 3/2015 | Preijert | B60G 9/02 280/124.17 |
| 9,597,938 B2 | * | 3/2017 | Spiegel | F16F 1/368 |
| 9,868,330 B2 | * | 1/2018 | Hahn | B60G 11/04 |
| 10,059,163 B2 | * | 8/2018 | Asbeck | F16F 3/10 |
| 10,549,594 B2 | * | 2/2020 | Chihara | B21D 19/00 |
| 2004/0080135 A1 | * | 4/2004 | Dudding | F16F 1/368 280/124.176 |
| 2004/0084822 A1 | * | 5/2004 | Collyer | F16F 1/30 267/293 |
| 2010/0038877 A1 | * | 2/2010 | Cortez | B60G 11/113 280/124.175 |
| 2016/0159181 A1 | * | 6/2016 | Hahn | B60G 11/04 267/40 |
| 2017/0313149 A1 | * | 11/2017 | Chihara | B21D 53/00 |
| 2018/0051763 A1 | * | 2/2018 | Marteau-Lorant | B60G 11/02 |

FOREIGN PATENT DOCUMENTS

| | | | | |
|---|---|---|---|---|
| DE | 102014202581 A1 | | 8/2015 | |
| EP | 3222871 A1 | | 9/2017 | |
| EP | 8222872 A1 | | 9/2017 | |
| JP | 2003-159923 | | 6/2003 | |
| JP | 2003237335 A | | 8/2003 | |
| JP | 2004-084758 | | 3/2004 | |
| JP | 2005075203 A | | 3/2004 | |
| JP | 2004306805 | | 11/2004 | |
| JP | 2005096493 A | | 4/2005 | |
| JP | 2018-502006 | | 1/2018 | |
| WO | WO-2016134810 A1 | * | 9/2016 | ............ B60G 11/02 |
| WO | 9003282 A1 | | 9/2017 | |
| WO | 9003281 A1 | | 4/2019 | |

OTHER PUBLICATIONS

Search Report from the Austria Patent Office for Austria Patent Application No. A501392018, dated Jun. 20, 2018 ( 3 pages).
Japanese Patent Office, "Office Action", mailed in connection with patent application No. 2020-542016 dated Sep. 20, 2022, 12 pages.
Office Action from the China National Intellectual Property Administration for China Patent Application No. 201980012893.2, dated Jul. 5, 2021 (17 pages).
Office Action from the Japan Patent Office for Japanese Patent Application No. 2020-542016, dated Oct. 29, 2021 (18 pages).

* cited by examiner

SPRING FOR USE IN CONJUNCTION WITH A VEHICLE

CROSS-REFERENCE TO RELATED APPLICATIONS

The present application is a U.S. national stage application of International Patent Application No. PCT/EP2019/050395, filed Jan. 9, 2019, which claims the benefit of Austrian Patent Application No. A 50139/2018, filed Feb. 14, 2018, both of which are incorporated by reference herein in their entireties.

The invention relates to a spring with the features of the preamble of claim 1.

In vehicle construction, it is known to provide the wheels and the chassis of a vehicle with a spring suspension against one another. Especially in the case of particularly large and heavy vehicles, use is made of leaf springs for this purpose, since a broad range of loading requirements is covered by a simple design.

Springs with a non-linear, in particular progressive, characteristic curve have proved to be particularly advantageous, since such a characteristic curve has a favourable effect on the driving characteristics of a vehicle which is equipped with such a spring suspension.

A one-part leaf spring made of fibre-reinforced plastic material with a progressive characteristic is known from EP 2 885 554 B1. This spring is a leaf tension spring, i.e. it is designed such that when installed it is increasingly subjected to a tensile load with increasing vertical forces introduced by the wheel carrier. For this purpose, the spring comprises two mechanically unprocessed end regions, which are clamped in fixed receiving devices in a moment-resistant and torque-resistant manner, wherein the end regions run through the receiving devices and the neutral fibre through the swivelling axis of the receiving devices. A drawback is that the permitted maximum tension is reduced by the load combination with this spring and the material design and the fitting of the spring on a vehicle come at the cost of a reduced load-bearing capacity.

A generic, one-part spring made of spring steel with a progressive characteristic is proposed in WO 2016/134810 A1, which is subjected to a bending load and which avoids the aforementioned drawbacks. This spring is deflected from the central region on one side of the leaf spring and comprises adjacent to the central region a first curvature region with a first curvature direction and a first vertex, wherein the first vertex is located on one side of the central axis. This region has in the direction towards the end region a second curvature region with a second curvature direction and a second vertex, wherein the second curvature direction is opposed to the first curvature direction and wherein the second vertex is located on the side of the central axis lying opposite the first vertex. Whilst the drawbacks of the initially mentioned leaf tension spring are thus overcome, a force distribution arises in the region deflected from the central region in particular due to shearing forces, which force distribution is accompanied by the risk of a high degree of wear and therefore undesirable material fatigue.

The problem underlying the invention is to provide a leaf spring with a progressive spring rate, which can easily be produced from steel, wherein a longer durability of the spring is achieved by a uniform force distribution. It is also a problem of the invention to make available a leaf spring with a progressive spring rate and a high load-bearing capacity.

This problem is solved with a spring which has the features of claim 1.

Preferred and advantageous embodiments of the invention are the subject-matter of the sub-claims.

According to the invention, it is provided that, in the unloaded state, the spring leaf has two bending sections, wherein the bending sections each have a curvature with a curvature direction, wherein the curvature direction of the two bending sections is opposed and wherein the two bending sections merge into each other in the region of a turning point, and that the first bending section is a vertical spring section and runs from the end region of the first edge region via the central region to the turning point and the second bending section is a horizontal and vertical spring section and runs from the turning point to the end region of the second edge region. The first bending section acts as a vertical spring and the second bending section acts as a vertical spring and as a horizontal spring in the longitudinal direction of the spring.

The spring leaf of the spring according to the invention has precisely two curved bending sections. In the unloaded state, the bending sections each have precisely one curvature with a curvature direction. The spring leaf of the spring according to the invention is throughout made of steel, in particular of spring steel.

The spring produced according to the invention can have a markedly non-linear, in particular progressive, characteristic curve, which has a favourable effect on the driving characteristics of a vehicle which is provided with a spring suspension according to the invention. In addition, a spring according to the invention can absorb not only vertical force components, but also horizontal force components, which arise in particular during a braking operation, since the second bending section also acts as a horizontal spring section, as it were as a spring in the spring. A uniform force distribution occurs, since horizontal force components are distributed over the entire length of the spring. The durability and load-bearing capacity are thus increased, wherein better driving characteristics can be achieved for the vehicle.

Only minimal shearing forces occur in the central region in a spring according to the invention. Since the spring thus has to be constituted less thick especially in the central region, material can be saved and a spring with a lower weight can be produced.

In a particularly preferred embodiment, it is provided that the first bending section is longer than the second bending section and that the second bending section is more markedly curved than the first bending section. In the unloaded state, the first bending section has only a slight curvature, wherein the central region is arranged beneath the end region of the first edge region and beneath the turning point, in which region the two bending sections merge into one another. Under load, the first bending section bends upwards and acts as a vertical spring section.

In a preferred embodiment, the first edge region has an essentially constant effective length from the corresponding end region to the central region in all loading states. With an increasing load, the central region of the spring thus moves essentially in the vertical direction and only insignificantly horizontally in the longitudinal direction of the spring. The effective length of the section of the first bending section running from the central region to the turning point becomes greater with increasing load, so that a compressive force is exerted on the second bending section in the longitudinal direction of the spring.

Within the scope of the invention, it is preferably provided that the rolled eye for connecting the end region of the second edge region to the chassis and optionally the rolled eye for connecting the end region of the first edge region to the chassis can be fastened rotatably, in particular moment-loaded, preferably torque-loaded, to the chassis. The second bending section is not therefore directly compressed by the compressive force, but rather the section of the second bending section running to the end region is bent by the rotary motion in the direction of the rolled eye, wherein this section gets steeper when installed. The rotary motion of the spring according to the invention is part of the suspension action.

The first bending section is accordingly bent in the vertical direction and the second bending section is loaded in the horizontal direction, so that a combination of two bending loads occurs.

Within the scope of the invention, it can advantageously be provided that the rolled eye can be fastened to the chassis so as to be rotatable about a rotary axis, wherein the neutral fibre of the spring and optionally the neutral bending fibre of the spring, in particular of the edge region, are spaced apart from the rotary axis.

Within the scope of the invention, it can also advantageously be provided that a bearing bush is arranged in each case in the rolled eyes, said bearing bush preferably acting in a rotationally elastic manner. By means of the bearing bush, which is preferably made of rubber, a dampening effect is achieved which leads to a softer spring behaviour.

In a preferred embodiment of the invention, it is provided that the second edge region runs from the central region via the turning point to a vertex and from the vertex continuously, preferably essentially straight, to the corresponding end region. In particular this straight-running region is inclined by the rotary motion described above, in such a way that when installed it runs more steeply with increasing load.

In a preferred embodiment of the invention, it is provided that the section running from the vertex to the end region of the second edge region and the section running from the vertex in the direction of the central region are arranged in the region of the vertex at an angle α of greater than 80°, preferably of greater than 90°, for example of approximately 100 to 150°, preferably of 120 to 140°, in particular of the 130° with respect to one another. With increasing load, angle α at first remains essentially the same and then increases. With vertical loading on the central region, the section of the first bending section running from the central region to the turning point bends upwards. The resultant compressive force on the second bending section in the longitudinal direction of the spring leads, on account of the rotary bearing, to a rotary motion of the second bending section, so that angle α at first remains constant. The rotary motion takes place only up to a certain point, at which the edge region of the second bending section running from the vertex to the end region remains in an essentially constant position. With further vertical loading on the central region, however, the section of the first bending section from the central region to the turning point bends further upwards, so that angle α increases.

Within the scope of the invention, the first bending section can have a lesser bending strength than the second bending section.

In a preferred embodiment of the invention, the rolled eyes each have an end face, wherein in particular the rolled eyes are deflected starting from the respective edge region and run essentially in a circular shape, and wherein a gap is present between the surface of the edge region and the end face of the rolled eye. This embodiment is therefore advantageous, since the spring made of steel can easily be produced in a heat deformation process, whereas such rolled eyes cannot be produced in the case of springs made of plastic.

It is particularly preferable if both rolled eyes run on the same side of the spring, i.e. on the upper side of the spring when installed ("rolled-up eye") or on the lower side when installed ("unrolled eye"). Within the scope of the invention, so-called "Berliner eyes" are also conceivable.

Within the scope of the invention, it is preferably provided that the central region of the spring comprises a clamping region, which can be connected to a wheel axle or a wheel axle bolt by means of a connection device, in particular by one or more U-shaped bolts or moulded parts encompassing the spring in the clamping region. The central region can comprise a clamping region, the thickness (height) of which is greater than the thickness of the adjacent edge regions, and can comprise transition regions, in which the thickness of the spring leaf correspondingly increases or diminishes.

The spring leaf of the spring according to the invention is in one piece. Within the scope of the invention, it is preferable if the spring is a single-leaf spring. A spring according to the invention can however also be combined with an auxiliary leaf or with two or more auxiliary leaves.

With vertical loading in the centre of the spring, the multiple bending of the bending sections and the translatory fixed clamping (rotation is possible) in both spring eyes produce a double spring—on the one hand vertical (first bending section), as leaf springs always act, and on the other hand horizontal (second bending section). The bending forces act together and produce the non-linear spring behaviour.

The invention is explained in greater detail with the aid of an example of embodiment according to the drawings. In the figures.

Figure 1:
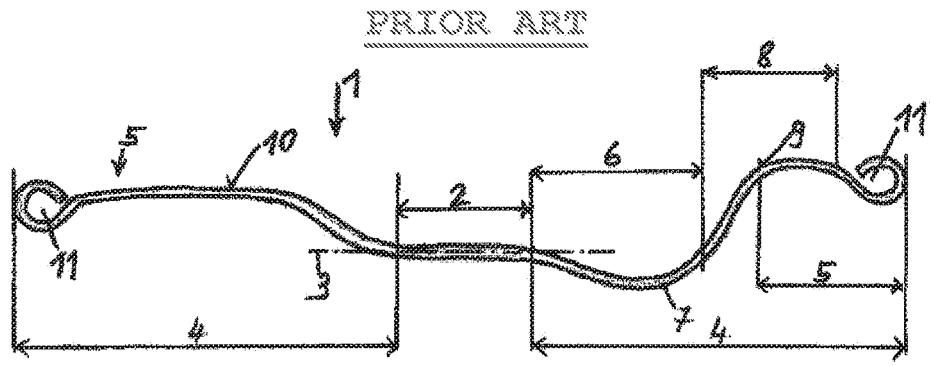
FIG. 1 shows a generic, single-part spring made of spring steel.

FIG. 1 represents a known leaf spring 1 made of spring steel in an essentially unloaded state. The leaf spring 1 has a central region 2 with a central axis 3 and two edge regions 4. The edge regions 4 each have an end region 5. The right-hand edge region 4 has, adjacent to central region 2, a first curvature region 6 with a first curvature direction and a first vertex 7, wherein the first vertex 7 is located on the lower side of central axis 3. This edge region 4 has, adjoining in the direction of its end region 5, a second curvature region 8 with a second curvature direction and a second vertex 9, wherein the second curvature direction is opposed to the first curvature direction and wherein second vertex 9 is located on the upper side of central axis 3. The end region 5 of the right-hand edge region 4 is inclined away from the second vertex 9 towards the side on which the central region 2 is located. The edge regions 5 each have a rolled eye 11 for connecting the leaf spring 1 to a chassis of a vehicle.

The upper side of leaf spring 1 represented in FIG. 1 is its upper side 10, which points towards the vehicle chassis in the installed position in the vehicle.

In the region of first curvature region 6, a force distribution occurs in particular due to shearing forces, which force distribution is accompanied by the risk of a high degree of wear and therefore undesired material fatigue. In addition, first curvature region 6 leads to a reduction in the ground clearance, as a result of which the risk of damage when driving over an obstruction, e.g. a curbstone, is increased.

Figure 2:
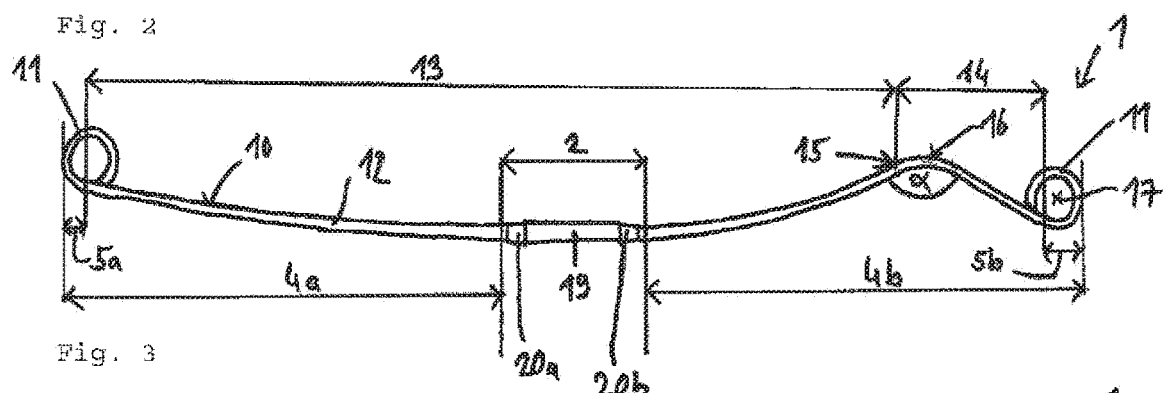
FIG. 2 shows an embodiment of a single-part spring made of spring steel according to the invention.
Figure 3:
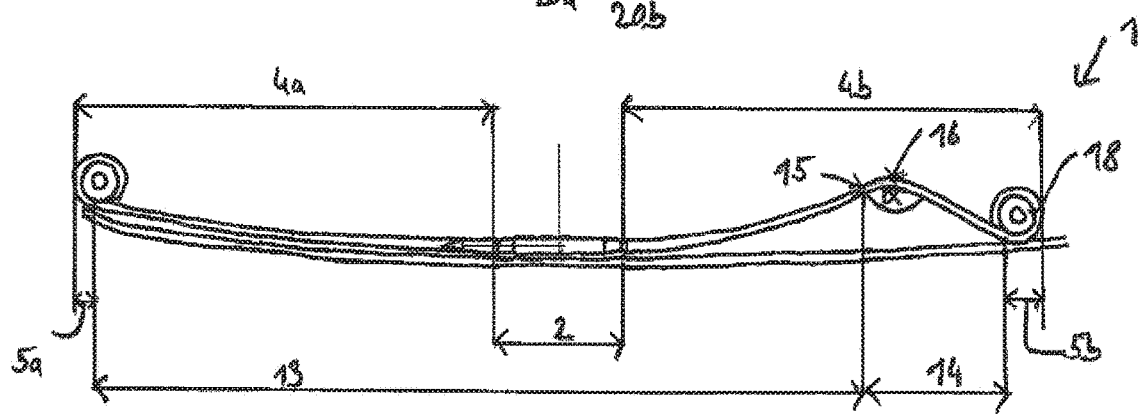
FIG. 3 shows an embodiment of a single-part spring made of spring steel according to the invention in combination with bearing bushes and an auxiliary leaf and FIG. 4 shows a detail view in the region of a rolled eye.

FIGS. 2 and 3 represent embodiments of a spring leaf 1 according to the invention as a parabolic spring for use in conjunction with a motor vehicle. The leaf spring 1, which can be produced in a heat deformation process, has a one-part spring leaf 12 made of spring steel with a central region 2 and two adjacent edge regions 4a, 4b. The edge regions 4a, 4b each have an end region 5a, 5b, wherein the end regions 5a, 5b can each be connected to a chassis in a stationary manner via a rolled eye 11 and wherein the total length of the leaf spring 1, i.e. the distance between the two eyes 11, when installed on the motor vehicle is substantially unchangeable in all load states.

In the unloaded state, the spring leaf 12 has two bending sections 13, 14, wherein bending sections 13, 14 each have a curvature with a curvature direction, wherein the curvature direction of the two bending sections 13, 14 is opposed and wherein the two bending sections 13, 14 merge into each other in the region of a turning point 15. The first bending section 13 runs from the end region 5a of the first edge region 4a via the central region 2 to the turning point 15 and the second bending section 14 runs from the turning point 15 up to the end region 5b of the second edge region 4b. The second edge region 4b runs from the central region 2 via the turning point 15 to a vertex 16 and from the vertex 16 essentially straight to the end region 5b.

The rolled eyes 11 can be fastened to the chassis via a bearing bush 18 so as to be rotatable about a rotary axis 17, wherein the neutral fibre of leaf spring 1 and the neutral bending fibre of edge regions 4a, 4b are each spaced apart from rotary axis 17. Both rolled eyes 11 run at upper side 10 of leaf spring 1.

The central region 2 has a clamping region 19, the thickness (height) of which is greater than the thickness of the adjacent edge regions and which can be connected to a wheel axle or a wheel axle bolt for example by means of U-shaped bolts. The central region 2 has transition regions 20a, 20b between the clamping region 19 and the edge regions 4a, 4b adjacent to central region 2, in which transition regions the thickness of leaf spring 12 correspondingly increases or diminishes.

The upper side of leaf spring 1 represented in FIGS. 2 and 3 is its upper side 10, which points towards the vehicle chassis in the installed position in the vehicle. Turning point 15 is arranged above central region 2 in the installed state on the vehicle in the presence of nominal load.

Figure 4:
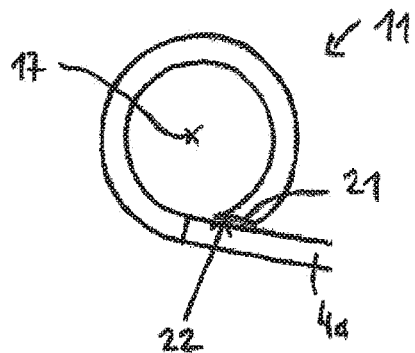

As can best be seen in FIG. 4, rolled eyes 11 each have an end face 21. The rolled eyes 11 run in an essentially circular shape, wherein a gap 22 is present between upper the side 10 of the corresponding edge region 4a, 4b and the end face 21 of the rolled eyes 11.

The drawbacks described in connection with the prior art (see FIG. 1) are removed with a leaf spring 1 according to the invention.

In the case of motor vehicles, a distinction is made between cars (PKW) and lorries (LKW). In the case of lorries, a distinction is also made between light-weight lorries ("LLKW", up to 7.5 t), medium-weight lorries ("LKW", from 7.5 t to 12 t) and heavyweight lorries ("SLKW", from 12 t). The demands with regard to the spring suspension or wheel suspension are in each case different on account of the loads to be transported. A spring according to the invention can be used with all known motor vehicles.

The invention claimed is:

1. A spring for use in conjunction with a motor vehicle, wherein the spring is a leaf spring, which has a one-part spring leaf made of spring steel, with a central region and two adjacent edge regions, wherein the edge regions each have an end region, wherein the end regions can each be connected to a chassis in a stationary manner via a rolled eye, wherein each rolled eye is translatory fixed and rotational in relation to the chassis, and wherein the total length of the spring in an installed state on the vehicle is substantially unchangeable in all load states,
wherein in the unloaded state, the spring leaf has precisely two bending sections which are a first bending section and a second bending section, each having a curvature with a curvature direction, wherein the curvature direction of the first bending section and the curvature direction of the second bending section are opposed and wherein the first bending section and the second bending section merge into each other in the region of a turning point, and
wherein the first bending section is a vertical spring section and runs from the end region of the first edge region via the central region to the turning point and the second bending section is a horizontal and vertical spring section and runs from the turning point to the end region of the second edge region.

2. A spring according to claim 1, wherein the first bending section is longer than the second bending section and that the second bending section is more markedly curved than the first bending section.

3. A spring according to claim 1, wherein the first edge region has an essentially constant effective length from the end region to the central region in all load states and that the effective length of the section of the first bending section running from the central region to the turning point becomes greater with increasing load, so that a compressive force is exerted on the second bending section.

4. A spring according to claim 1, wherein the rolled eye for connecting the end region of the second edge region to the chassis is fastened rotatably to the chassis.

5. A spring according to claim 4, wherein the rolled eye can be fastened to the chassis so as to be rotatable about a rotary axis, wherein a neutral fibre of the spring is spaced apart from the rotary axis.

6. A spring according to claim 1, wherein a bearing bush is arranged in each rolled eye, said bearing bush acting in a rotationally elastic manner.

7. A spring according to claim 1, wherein the second edge region runs from the central region via the turning point to a vertex and from the vertex continuously, and essentially straight, to the end region.

8. A spring according to claim 7, wherein the section running from the vertex to the end region of the second edge region and the section running from the vertex in the direction of the central region are arranged in the region of the vertex at an angle ($\alpha$) of greater than 80° with respect to one another.

9. A spring according to claim 8, wherein with increasing load, the angle ($\alpha$) at first remains essentially the same and then increases.

10. The spring of claim 8, wherein the angle ($\alpha$) is 100 to 150°, or 120 to 140°, or 130°.

11. A spring according to claim 1, wherein the first bending section has a lesser bending strength than the second bending section.

12. A spring according to claim 1, wherein the rolled eyes each have an end face.

13. A spring according to claim 12, wherein the rolled eyes are deflected starting from the respective edge region and run essentially in a circular shape, and that a gap is present between the surface of the edge region and the end face of each rolled eye.

14. A spring according to claim 13, wherein the rolled eyes run on the same side of the spring, on the upper side of the edge region of the spring in an installed state or on the lower side of the edge region of the spring in an installed state.

15. A spring according to claim 1, wherein the central region comprises a clamping region, which can be connected to a wheel axle or a wheel axle bolt by means of a connection device, by one or more U-shaped bolts or moulded parts encompassing the spring in the clamping region.

16. The spring of claim 1 wherein the spring is a parabolic leaf spring.

17. The spring of claim 1, wherein the first bending section runs from the end region of the first edge region through the central region to the turning point.

\* \* \* \* \*